United States Patent [19]
Bowen et al.

[11] Patent Number: 6,147,695
[45] Date of Patent: Nov. 14, 2000

[54] SYSTEM AND METHOD FOR COMBINING MULTIPLE VIDEO STREAMS

[75] Inventors: Andrew Bowen, San Jose; Gregory M. Eitzmann, Palo Alto; David Warren, Mountain View; Dawn Maxon, Belmont; Michael T. Jones, San Jose; David L. Dignam, Belmont, all of Calif.

[73] Assignee: Silicon Graphics, Inc., Mountain View, Calif.

[21] Appl. No.: 09/140,396

[22] Filed: Aug. 26, 1998

Related U.S. Application Data

[63] Continuation-in-part of application No. 08/620,215, Mar. 22, 1996, Pat. No. 5,889,529.

[51] Int. Cl.[7] .............................. G06F 15/16; G06T 3/40
[52] U.S. Cl. .................................... 345/503; 345/439
[58] Field of Search ............................ 345/418, 419, 345/428, 433, 435, 439, 473, 475, 501, 503

[56] References Cited

U.S. PATENT DOCUMENTS

| | | | |
|---|---|---|---|
| 5,696,892 | 12/1997 | Redmann et al. | 345/425 |
| 5,844,562 | 12/1998 | Harrison | 345/419 |
| 5,877,771 | 3/1999 | Drebin et al. | 345/430 |
| 5,889,529 | 3/1999 | Jones et al. | 345/439 |
| 5,973,701 | 10/1999 | Vaswani | 345/430 |
| 5,977,977 | 11/1999 | Kajiya et al. | 345/418 |
| 5,982,373 | 11/1999 | Inman et al. | 345/419 |

*Primary Examiner*—Ulka J. Chauhan
*Attorney, Agent, or Firm*—Sterne, Kessler, Goldstein & Fox P.L.L.C.

[57] ABSTRACT

An operation for combining multiple video streams permits combining any number of overlay images and base images regardless of processes performed upon one or more of the images. Specifically, where the base images are dynamically sized and resized to provide a constant frame rate (despite varying frame complexity), the process similarly treats overlay images and even other base images. In the dynamic sizing process, a rendering time is compared to high and low water marks. During dynamic resizing, two double buffering operations and a synchronization operation are performed. After dynamic sizing and resizing, the resulting resized images are combined together, regardless of the frame rate of the individual images. Consequently, multiple video streams at varying frame rates are combined at a constant frame rate.

17 Claims, 9 Drawing Sheets

Base Image 302

Overlay Image 304

Output Image 306

SYSTEM AND METHOD FOR COMBINING MULTIPLE VIDEO STREAMS

CROSS-REFERENCE TO OTHER APPLICATIONS

The present application is a Continuation-In-Part of application Ser. No. 08/620,215, filed Mar. 22, 1996 now Pat. No. 5,889,529. application Ser. No. 08/620,215 is incorporated herein by reference in its entirety.

BACKGROUND OF THE INVENTION

1. Field of the Invention

The present invention relates to the field of computer graphics. Specifically, the present invention relates to operations connected to combining two or more frames of data in computer graphics.

2. Related Art

Modern graphics offers seemingly unlimited opportunities for providing realistic two- and three- dimensional graphics. Modorn advances include visual simulation and virtual reality, where the user operates in an interactive graphics environment. Unfortunately, greater complexity in graphics images can interfere with maintaining a constant frame rate, which is the rate that graphics frames (comprising colored pixels) are output for visual display. When the frame rate is not constant, the transitions between frames are less continuous and less smooth, making for less realistic images for the viewer.

The Infinite Reality Graphics System™ is a well known and highly regarded graphics display system, sold by Silicon Graphics, Incorporated, (SGI). The Infinite Reality Graphics System™ can use the OpenGL™ application programming interface (API), which is also well known. In the graphics pipeline of this system, a host running OpenGL™ creates "vertices," describing the shapes of graphical objects. These vertices are sent to a geometry system, which calculates geometrical aspects of the graphical objects (including lighting and transformation calculations) to produce primitives or "lit triangles." The primitives are sent to a rasterization system, where various techniques are used to form two-dimensional fragments from the primitives. The fragments are combined into pixels in a frame buffer, with each pixel being a digital representation (via bits of data) of the fragments. The pixels for each graphics frame are read by a display system, converted to analog data, and transmitted for display on a screen.

The Infinite Reality Graphics System™ user is given the option of using overlay images, in addition to base images. Base images are the primary images processed by the system; they must be updated frequently by the system. Overlay images are images that are overlaid on top of the base images, and are typically updated less frequently than base images. For example, in a race car video game where the user has the viewpoint of the car's driver, the base images are the road and scenery traveled by the car, whereas the overlay image is the driver's control panel (including a frequently updated speedometer and fuel gauge).

There are separate frame buffers for the base image and the overlay image. To save space in an overlay frame buffer, the Infinite Reality Graphics System™ can use color indices, in place of the actual pixels, to store the graphical colors for the pixels. Color indices are values used to index into a color table, where the actual values are stored. However, the use of color indices causes a problem in that the overlay image and the base image of a frame cannot be blended. While the base image is stored as actual pixels, the overlay image is stored in encoded ("codebook") format. Thus, there is a need to be able to blend these images regardless of the format differences.

Moreover, as noted above, the complexity of the image can adversely affect the constancy of the frame rate. Like in most graphics systems, the graphics pipeline of the Infinite Reality System™ can be slowed down by complex images. Two process rates slow the pipeline most notably: first, the rate at which the geometry system produces the primitives; and second, the rate at which the primitives are rasterized into fragments, for loading into the frame buffer. Resizing of the base image can be performed to overcome the slow-down for complex images, but it is difficult (if not impossible) to blend the resized base image with the overlay image by previous methods. It must be noted that resizing of the base image is not well known, and has only been previously described in the copending application Ser. No. 08/620,215 (entitled "Dynamic Image Resizing," filed Mar. 22, 1996, and incorporated herein by reference). Furthermore, any other technique or processing performed on the base image will make combining the base and the overlay images difficult by previous methods. On an even broader level, there is a need in the computer graphics art to permit combining images of varying complexity, but at the same time to maintain high-resolution images at a constant frame rate. One desired application is to combine any two or more video streams, while maintaining few or no distortions. There is also a need to better utilize the bandwidth available in video graphics systems to maintain high resolution and smooth transitions between frames.

SUMMARY OF THE INVENTION

The present invention overcomes these problems by providing a system and method for processing a base image and an overlay image in a similar manner. If the base image is dynamically sized and resized to maintain a constant frame rate, the present invention provides a method (and system) for dynamically sizing and resizing the overlay image in a similar manner, and combining the resulting resized base and overlay images together. This provides overlay functionality regardless of how the base image is processed by a graphics system.

More generally, the present invention provides a system and method for combining a plurality of images, each of which may be separately dynamically sized and resized, and then combining them together into a combined image. This provides a method of processing multiple video streams, of possibly varying frame rates, into a single, coherent, image having a constant frame rate.

More particularly, the present invention provides a system and method for combining image frames 1 through n, where n is an integer greater than or equal to two. Initially, a partial rendering of image frames 1 through n is performed. This includes generating vertices describing shapes of desired graphical objects, performing geometry calculations on the vertices to generate primitives, and transmitting the primitives to a system that rasterizes them.

Second, image frames 1 through n are dynamically sized by calculating one or more image frame resolutions. The resulting frames are then dynamically resized to generate resized image frames 1 through n.

In one embodiment, dynamic sizing and resizing has two components. The first component is dynamic sizing. During dynamic sizing, for each image frame, a rendering operation and resolution calculation (for the next frame) are performed. The current image frame is rendered into a frame buffer at an image frame resolution. A rendering time is computed, determined by how long it takes to render a previous image frame into the frame buffer. The rendering time is compared to a high-water mark, which represents a second rendering time at which an image frame resolution would start to be reduced. The resolution for a next image frame is reduced if the rendering time exceeds the high-water mark. The rendering time is compared to a low-water mark, which represents a third rendering time at which an image resolution would start to be increased. The resolution for a next image frame is expanded if (1) the rendering time is below the low-water mark and (2) the image frame resolution does not equal a target resolution.

The second component is dynamic resizing. During dynamic resizing, two double buffering operations and a synchronization operation are performed. First, the current image frame is double buffered, meaning a first frame buffer receives the current image frame and a second frame buffer stores a previously-rendered image frame. Second, a buffered resolution coefficients register stores the image frame resolution, and a resolution coefficients register stores an image frame resolution for a previously-rendered image frame. Third, synchronization of these double buffering steps is performed. Here, the first frame buffer and the second frame buffer are swapped concurrently, with a transfer of the content of the buffered resolution coefficients register to the resolution coefficients register.

A similar method for the above-noted dynamic sizing and resizing steps is presented in copending application Ser. No. 08/620,215 (entitled "Dynamic Image Resizing," filed Mar. 22, 1996), which is incorporated herein in its entirety.

After dynamic sizing and resizing occurs, the resized images are combined into a combined image. In one embodiment, a binary pixel display method is used. Here, as between a first image frame (of image frames 1 through n) and a second image frame (of image frames 1 through n), a pixel of the first image frame is displayed in lieu of a corresponding pixel of the second image frame if the first image frame pixel is opaque. On the other hand, the corresponding pixel of the second image frame is displayed if the first image frame pixel is non-opaque.

In a second embodiment, a blending display method or any other pixel merging operation is used. For example, for the blending display method, the pixels of a first image frame (of image frames 1 through n) and corresponding pixels of a second image frame (of image frames 1 through n) are blended together.

BRIEF DESCRIPTION OF THE FIGURES

The invention is best understood by reference to the following figures.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

I. Example Environment

The present invention can be described in terms of an example environment. This example environment uses the Infinite Reality Graphics System™ (hereinafter "Infinite Reality System") for graphical image display, sold by Silicon Graphics, Incorporated (SGI). The Infinite Reality System described uses an Onyx2 display processor module as a host computer, which runs an OpenGL™ applications programming interface (API). OpenGL™ consists of hundreds of functions that permit graphics programmers to specify graphical objects. The Infinite Reality System permits the user programmer to render two-and three-dimensional objects into a frame buffer for storage as pixels, which are transmitted by a display system onto a cathode ray tube (CRT) for user display.

Although the invention is described in terms of this example environment, description in these terms is provided for convenience only. It is not intended that the invention be limited to application in this example environment. In fact, after reading the following description, it will become apparent to those skilled in the relevant art how to implement the invention in alternative environments.

The following sources are helpful for understanding graphics applications, and are hereby incorporated by reference in their entirety: OpenGL™ Reference Manual, Second Edition, Addison-Wesley Developers Press, 1997, ISBN 0-201-46140-4, OpenGL™ Architecture Review Board: Jackie Neider, Tom Davis, Mason Woo; OpenGL™ Programming Guide, Addison-Wesley Developers, 1993, ISBN 0-201-63274-8, OpenGL™ Architecture Review Board: Jackie Neider, Tom Davis, Mason Woo; and OpenGL™ Programming for the X Window System, Addison-Wesley Developers Press, 1996, ISBN 0-201-48359-9, Mark J. Kilgard.

II. Rendering and Displaying Image Frames

Figure 1:
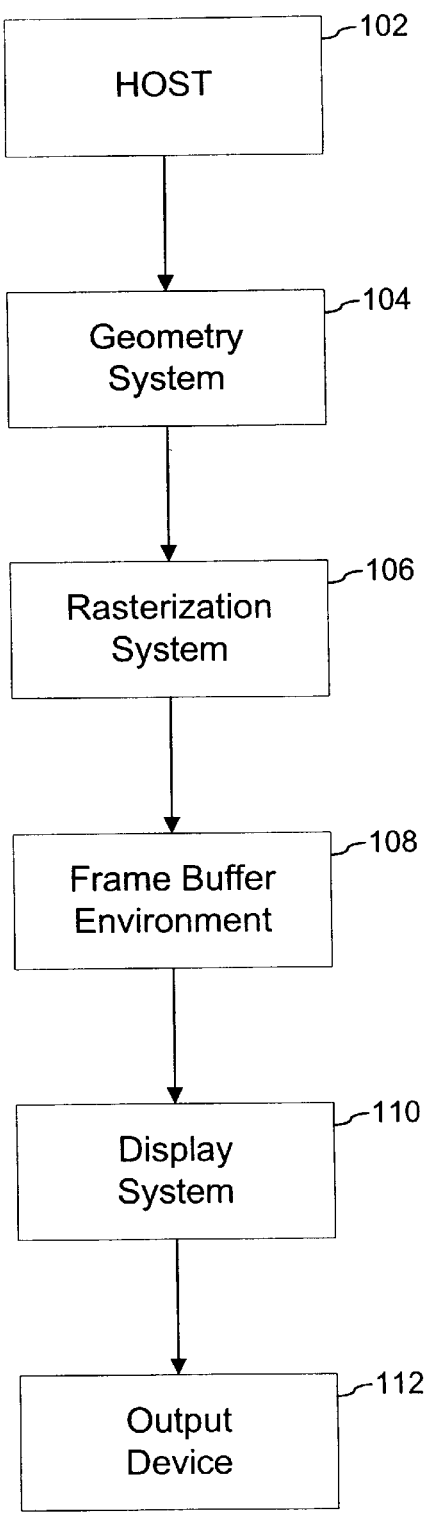
FIG. 1 is a flow chart illustrating a general pipeline hierarchy for a typical display system.

FIG. 1 illustrates a general pipeline hierarchy for the typical display system. Host 102 is the entity running the main application. Host 102 can be a generic processor, such as a PC processor, a mainframe computer processor, or a workstation processor. In a preferred embodiment, host 102 is an Onyx2 processor module. In this preferred embodiment, the main application is the OpenGL API. Host 102, running OpenGL, creates vertices describing the shapes of desired objects, such as points, line segments, and polygons. Other graphics API, languages, or systems can be used. OpenGL, of course, can be run without the present invention.

Host 102 sends these vertices to a geometry system 104. Geometry system 104 will handle calculation of geometrical aspects of a graphical object, including lighting calculations, transformational calculations, rotational calculations, perspective calculations, and other recognized geometrical calculations. As a result of the geometry calculations, entities called primitives are formed. These primitives, sometimes referred to as "lit triangles", are geometric objects with edge flags, including color and texture information.

Geometry system 104 is optional because some hosts include the geometry calculation function. In such systems, the geometry system 104 solely comprises software. In a preferred embodiment, however, geometry system 104 comprises a GE14 card in an Infinite Reality System. The GE14 card comprises both hardware and software, specifically four custom processors running in parallel on a hardware platform.

Geometry system 104 sends the formed primitives to rasterization system 106. Rasterization system 106 rasterizes the primitives into two-dimensional images called fragments, comprising points having associated color, depth, and texture data. Rasterization, which is a technique recognized by those skilled in the art, takes the points of the lit triangles and determines the characteristics (colors, textures) of the intermediate points of these triangles. In a preferred embodiment, rasterization system 106 comprises one or more RM7 cards, which are the rasterization cards in an Infinite Reality System.

The formed fragments are combined into pixels in frame buffer environment 108. Pixels are a digital representation of the fragment information. Pixels can store this information using different channels. For example, for an RGBA multi-spectral color model system, a single pixel stores information from four channels, comprising a red channel, a green channel, a blue channel, and an alpha channel. Each channel is represented by a pre-determined number of bits, with the red, green, and blue channels storing image color information, and the alpha channel storing opacity information.

As recognized by those skilled in the art, frame buffer environment 108 can be one of many different kinds of memory, including but not limited to, a memory integrated with application specific integrated circuits (ASICs), standard memory, and video memory. In a preferred embodiment, frame buffer environment 108 comprises one or more RM7 cards, which are the frame buffer cards in an Infinite Reality System. Digital media buffers can be used.

The entire process of creating vertices at the host, using the vertices to create primitives at the geometry system, rasterizing the primitives to form two-dimensional fragments at the rasterization system, and combining the fragments into pixels for storage in the frame buffer, is called rendering.

The pixels are sent to display system 110, for output to output device 112. As recognized by those skilled in the art, there are a myriad of output devices that can be used for the display function, which can use a variety of different standards. One example is a CRT ("television screen") using the National Standards Television Commission (NTSC) standard, which is the television standard adopted in North America. Another example is a television screen using the Phase Alternation Line (PAL) standard, which is the television standard adopted in Europe. Still another example is a digital standard for a liquid crystal display with a digital interface. There are also many well-known display systems, including generic and specifically-implemented graphics hardware. In a preferred embodiment, the display system 110 comprises one or more DG5 cards, which are the display system cards in an Infinite Reality System, and output device 112 is any type of CRT monitor.

Figure 2:
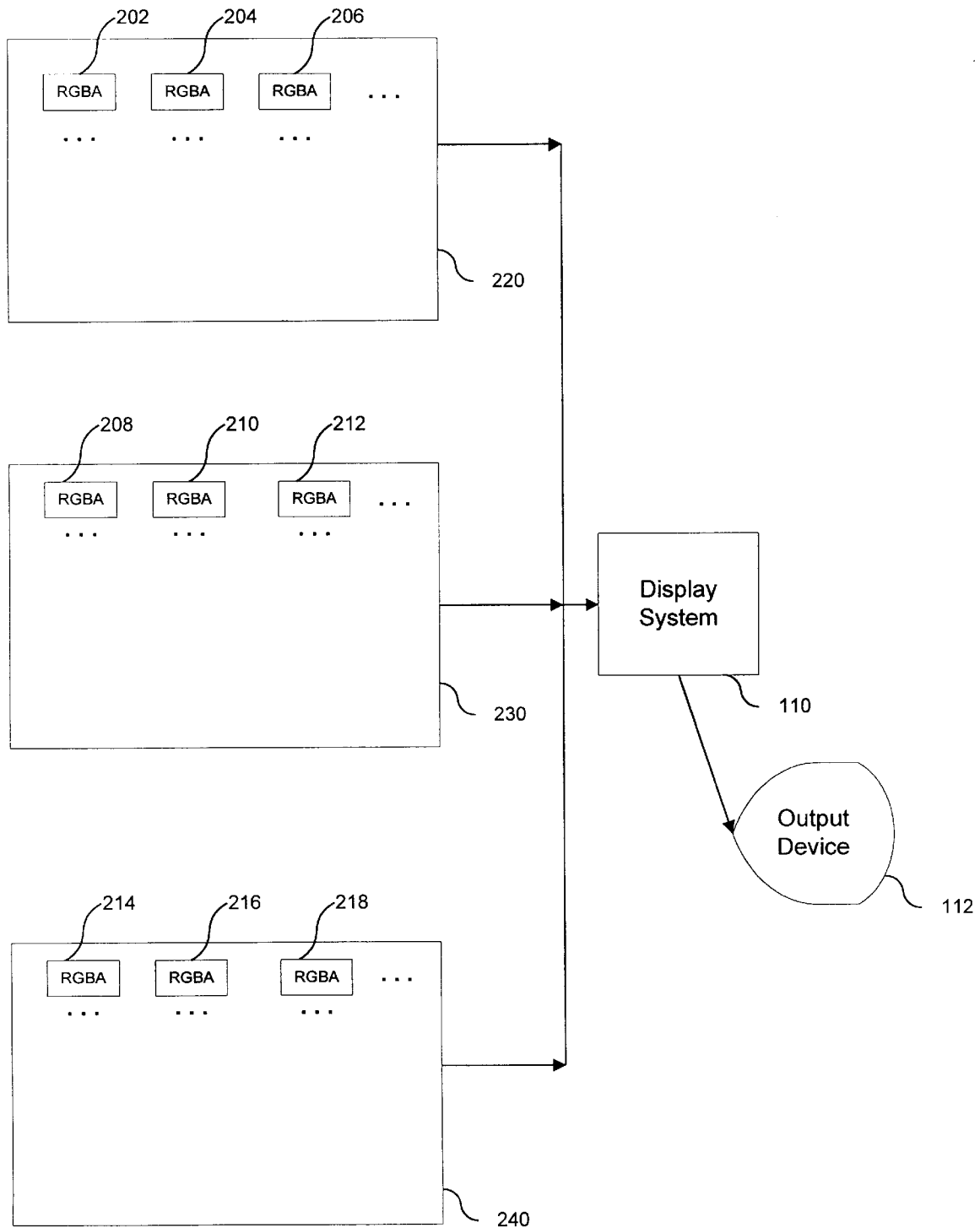
FIG. 2 illustrates a generic frame buffer environment.

Frame buffer environment 108 can include a single frame buffer or a plurality of frame buffers for storing the pixels. FIG. 2 illustrates a generic implementation of frame buffer environment 108. The frame buffer environment of FIG. 2 comprises first frame buffer 220, second frame buffer 230 and third frame buffer 240. Frame buffer 220 comprises numerous pixels, of which RGBA pixels 202, 204 and 206 are shown. Similarly, frame buffer 230 includes RGBA pixels 208, 210 and 212 and frame buffer 240 includes RGBA pixels 214, 216 and 218. Each of these frame buffers scan can store an entire image at any given time. In one embodiment, each of frame buffers 220, 230 and 240 stores 1280×1024 four-channel (R, G, B, A) pixels though those skilled in the art will recognize that different pixel sizes can be used.

Frame buffers 220, 230 and 240 are connected to display system 110, which can be a generic or specific type of scan-out hardware or hardware-software combination. Typically, display system 110 selectively reads the pixel information from one of frame buffers 220, 230 and 240, formats the data (e.g., from digital pixel data to analog data for display), and transmits the data to output device 112 for display.

The pixels comprising the frame buffer being displayed are referred to as a front buffer image, whereas the pixels of the frame buffer not being displayed are referred to as back buffer images. Frame buffers 220, 230 and 240 can also store pixel information transmitted from other regions of memory or write pixel information to other regions of memory.

In most applications, two (instead of three) frame buffers are used, in a process called double-buffering. The pixels of a current frame are rendered into a first frame buffer. This is the back buffer image. Simultaneously, the pixels of the previous frame are output from a second frame buffer and displayed onto the screen. This is the front buffer image. After the required content of the front buffer image is displayed, the roles of the frame buffers are reversed (called a "swap"). In other words, pixels for the next frame will be rendered into the second frame buffer, while the pixels for the current frame will be displayed from the first frame buffer. If the pixels of the previous frame are still being rendered into one frame buffer after the other frame buffer has completed displaying its pixels, then the displaying frame buffer simply displays its contents again, allowing more time for the previous image to be rendered before the next swap. A specific implementation of this process is discussed below, with reference to FIG. 7 in the context of dynamic image resizing.

The rate of rendering the pixels of a frame into the frame buffer, (i.e., the frame rendering "update rate") or of displaying pixels from the frame buffer onto a screen, (i.e., the screen "refresh rate") are measured by units of frames per second. In video, 60 frames per second is common, indicating that a single frame takes 1/60th of a second to render or display.

Those skilled in the art will recognize that one or more of the components of FIG. 1 can be combined into a single product. One example is $O^2$, which is an SGI product that integrates host 102, geometry system 104, rasterization system 106, and frame buffer environment 108 into a unified memory architecture. The present invention works for such environments as well. In fact, as those skilled in the art will recognize, the systems of FIGS. 1 and 2 are abstractions and not limiting.

III. Base Images and Overlay Images

Figure 3:
FIG. 3 illustrates three types of image frames, including a base image, an overlay image, and an output image 306.
Figure 3:
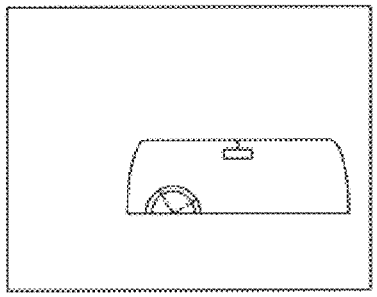
Figure 3:
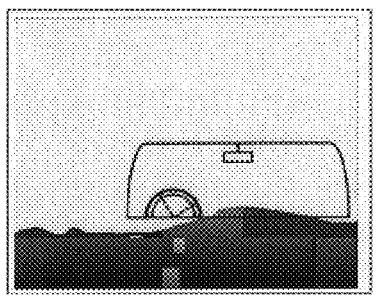

FIG. 3 illustrates three types of image frames, including a base image 302, an overlay image 304, and an output image 306. In reality, base image 302 and overlay image 304 represent "snap-shots" of displayed images, meaning the front buffer images associated with a single base image frame and a single overlay image frame.

Base image 302 is a primary image, which is required to be updated on a regular basis. As its name implies, overlay image 304 is a foreground image laid on top of the base image.

In the example of a race car computer game, base image 302 comprises the surrounding scenery and the road traversed by the car, whereas overlay image 304 comprises the car driver's control panel, including fuel gage, speedometer and targeting cross-hair displays. While the shapes and colors associated with the fuel gage, the speedometer and the targeting cross-hair displays are updated, they need not be updated nearly as often as those associated with the base image.

Overlay image 304 can be either less-detailed or more-detailed, therefore requiring less or more pixel data, than the base image. However, overlay image 304 (including the associated shapes, colors and textures) is most commonly an image required to be updated less frequently than base image 302.

Separate frame buffers are used for base image 302 and overlay image 304. In a double-buffering system, two frames are used for each type of image. In other words, there are first and second base image frame buffers and first and second overlay image frame buffers. Since overlay image 304 need not be updated as frequently as base image 302, the overlay image frame buffers are typically not as functionally complex as base image frame buffers. For example, overlay image frame buffers can lack some high fidelity rendering features (like depth buffer attributes) and provide less resolution, in terms of bits per pixel, than base image frame buffers.

FIG. 3 also shows output image 306, which is the resulting image formed by placing the overlay image 304 over the base image and 302. Although rendering the overlay image into the overlay image frame buffer and the base image into the base image frame buffer is essentially the same process, (save for the added complexity of the base image flame buffer) the process of displaying output image 306 involves a per-pixel decision-making process.

Figure 4:
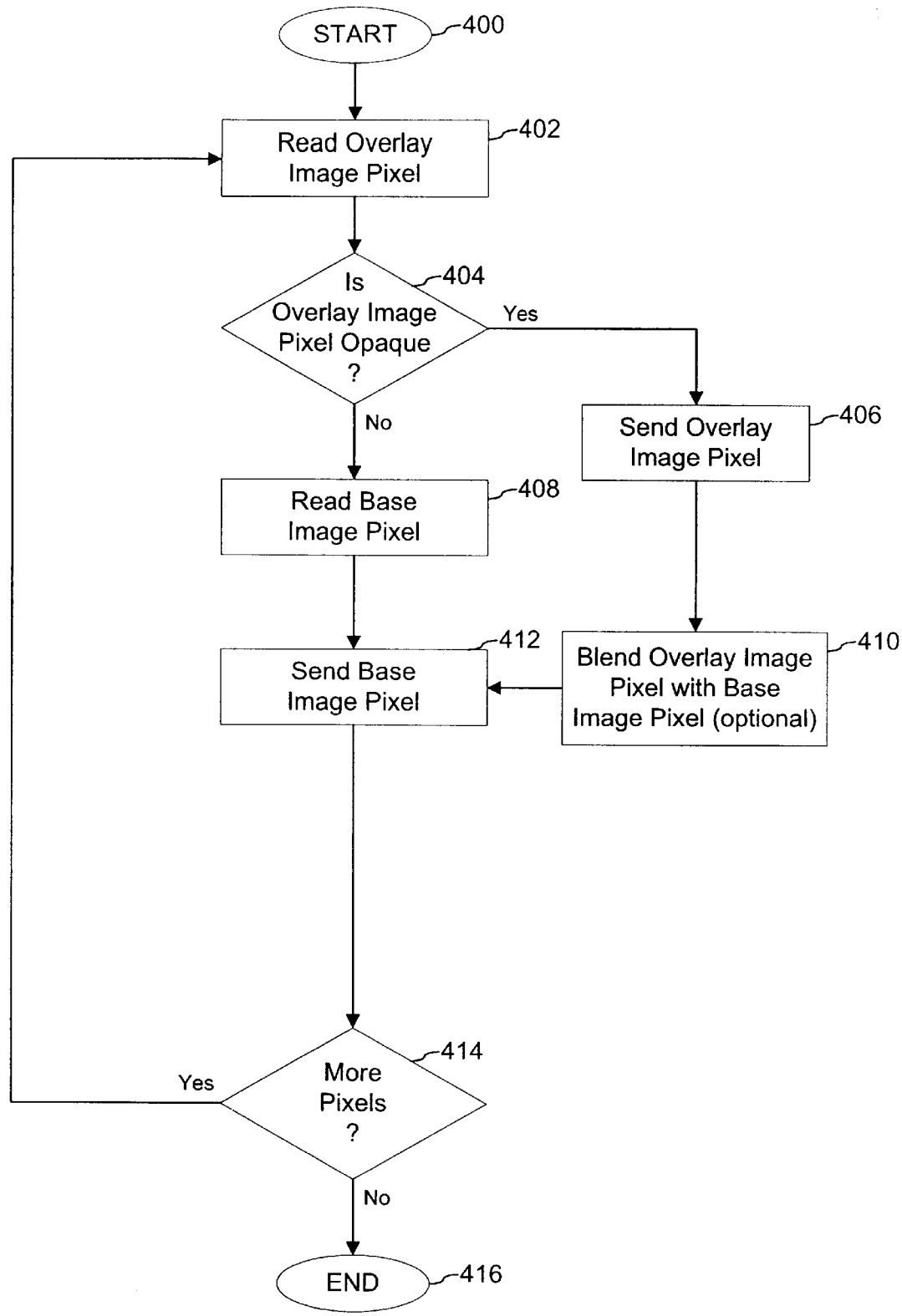
FIG. 4 illustrates the display processing for overlay image pixels and base image pixels.

This process is displayed in FIG. 4. In the double-buffering system used, image frame pixels are rendered into the first base image frame buffer, while display processing occurs at the second base image frame buffer. Similarly, overlay frame pixels are rendered into the first overlay image frame buffer, while display processing occurs at the second overlay image frame buffer. FIG. 4 illustrates the display processing, as between the second overlay image frame buffer and the second base image frame buffer. For each pixel in the second overlay image frame buffer and the corresponding pixel in the second base image frame buffer, a decision-making process is applied.

Following start step 400, the overlay image pixel is read in step 402. In step 404, it is decided if the read overlay image pixel is opaque. If it is opaque, the control passes to step 406, where it is decided that the overlay image pixel must be sent for display.

Step 410 is an optional step following step 406. In step 410, it is determined whether a base image pixel also exists at the location of the overlay image pixel (i.e., at same relative two-dimensional position). If so, then some form of blending occurs between the non-opaque overlay image pixel and the base image pixel. Any type of blending algorithm can be used.

If in step 404 it is decided that the read overlay image is not opaque, indicating that there is no overlay image at the pixel position, then control passes to step 408. In step 408, the corresponding base image pixel is read. This is the base image pixel that corresponds in relative two-dimensional position to the overlay image pixel that was read. Subsequently, in step 412, it is decided that the base image pixel must be sent for display.

Control passes from steps 410 (or 406) and 408 to step 412, wherein the item received by the display software and hardware elements are sent out for display. In a preferred embodiment, display system 110 (comprising one or more DG5 cards, which are the display system cards in an Infinite Reality System) and output device 112 (comprising any type of CRT monitor) are used for display. As those skilled in the art will recognize, any comparable display system and output devices can also be used.

One example of display processing is performed as follows. A set of steering magnets are used to deflect an electron beam across the screen, back and forth, from top to bottom, until all of the pixels are displayed. The pixel data is used to modulate the intensity of the electron beam. A CRT display will be refreshed at a pre-determined rate. This rate is determined by how long it takes for the electron beam to display all the pixels, and return to its initial position. This is the equivalent of displaying a single frame. As noted, a refresh rate of 1/60th of a second indicates that in 1/60th of a second, the entire screen, or the equivalent of one frame, is displayed. The frequency of the screen display is given by 1/(refresh rate). For a refresh rate of 1/60th of a second, the frequency is 60 Hz, or 60 cycles per second. The higher this refresh rate is, the more stable the created image is. Conversely, the lower the refresh rate is, the more likely it is that the human eye can discern the frames from one another.

In step 414, it is determined whether more pixels must be processed for the frame. If not, the process ends in step 416. If there are more pixels to be processed for this particular frame, then control passes back to step 402 for continuation of processing. In this manner, each pixel in the output image 306 will end up being either a base image pixel, an overlay image pixel, or a blended image pixel.

The processing according to FIG. 4 is used for explanatory purposes only, and is not limiting in its details. For example, depending upon the latency of the memory, groups of multiple pixels can be processed in parallel with one another. The order of the steps can also be taken in any logical manner, as those skilled in the art given this description will recognize.

It is also important to note that the swapping associated with double-buffering still occurs. Therefore, after the display processing of FIG. 4 occurs, for example, by displaying the pixels from the first overlay image frame buffer and from the first base image frame buffer, then a swap in the frame buffer positions occurs.

After the swap, the display processing of FIG. 4 is performed by displaying the pixels from the second overlay image frame buffer and from the second base image frame buffer. At this time, pixels for the next overlay image frame are rendered into the first overlay image frame buffer, while pixels for the next base image frame are rendered into the first base image frame buffer.

IV. Dynamic Image Resizing

A. An Overview of Dynamic Image Resizing

There can be widely varying differences in the complexities of frame images. There is also a need to maintain a constant frame rate between the sequential frames, while at the same time maintaining high resolution.

The source of the problem lies in the processing of geometry system 104 and rasterization system 106. As noted, in the geometry system 104, a series of calculations are preformed to generate "lit triangles" or primitives. In the rasterization system 106, estimations are used to calculate the values of the points between the vertices of these lit triangles. The greater the number of points that must be calculated, the more calculations required by the rasterization system 106.

Complex images place a greater burden on the processing of the rasterization system 106, making for slow-downs in the rendering portion of the graphics pipeline processing. In fact, the rasterization system 106 processing is more affected by complex images than the geometry system 104 processing.

Accordingly, a routine to expand and contract the size of the triangles was developed, thereby reducing the burden on the rasterization system 106. This invention, entitled "Dynamic Image Resizing," is disclosed in copending application Ser. No. 08/620,215 (filed Mar. 22, 1996), and is incorporated herein in its entirety. The resolution of complex images are reduced (by having the sizes of their triangles reduced) during the rasterization processing, while they are expanded back to size during the display processing.

The methodology of dynamic image resized, as used in the present invention, is described in further detail in the next section. It is important to note that this detailed discussion is not limited to, and in fact surpasses, the content of copending application Ser. No. 08/620,215, incorporated herein by reference above.

B. Dynamic Image Resizing in Detail

In the context of copending application Ser. No. 08/620, 215, dynamic image resizing is provided to the base image, not the overlay image. Therefore, the discussion contained therein pertains to the first and second base image frame buffers, not the first and second overlay image frame buffers. However, in the present invention, this limitation is no longer applicable. The unique implementation of the present invention (discussion of section V below) makes it possible to apply dynamic image resizing to a base image, an overlay image, or to any combination of base and overlay images.

During dynamic image resizing, within one frame, a graphic image is drawn according to an image resolution, whereas in the subsequent frame, the drawn image is then output to the display device at a target resolution. Therefore, graphic images, regardless of image complexity, are processed and displayed at a constant frame rate.

As will become apparent from the following discussion, the dynamic image functionality is produced by providing: (1) an algorithm for reducing (or expanding) the sizes of the triangles, which in turn reduces (or expands) the sizes of the rendered image (by affecting the image's resolution) in rasterization system 106, and (2) an algorithm for resizing the reduced (or expanded) image to a target level in display system 110. In fact, the model described herein is referred to colloquially as a "pull model," because after rasterization system 106 renders to a frame buffer, in the subsequent frame the pixels of the rendered image are "pulled" out for display processing by display system 110.

Through described in these terms, this embodiment is not to be viewed as limiting. As will be recognized by those skilled in the art, the dynamic image resizing functions can be combined in one or more systems of the graphics pipeline, or can instead be separated from these components into one or more independent entities. In addition, as those skilled in the art will recognize, the functions can be provided by either software or hardware or a combination of both. For instance, another model that can be used is a "push model." As those skilled in the art will recognize, in a push model, the pixels of the subsequent frame are "pushed" out by the rasterization system 106, for display processing by display system 110.

Figure 5:
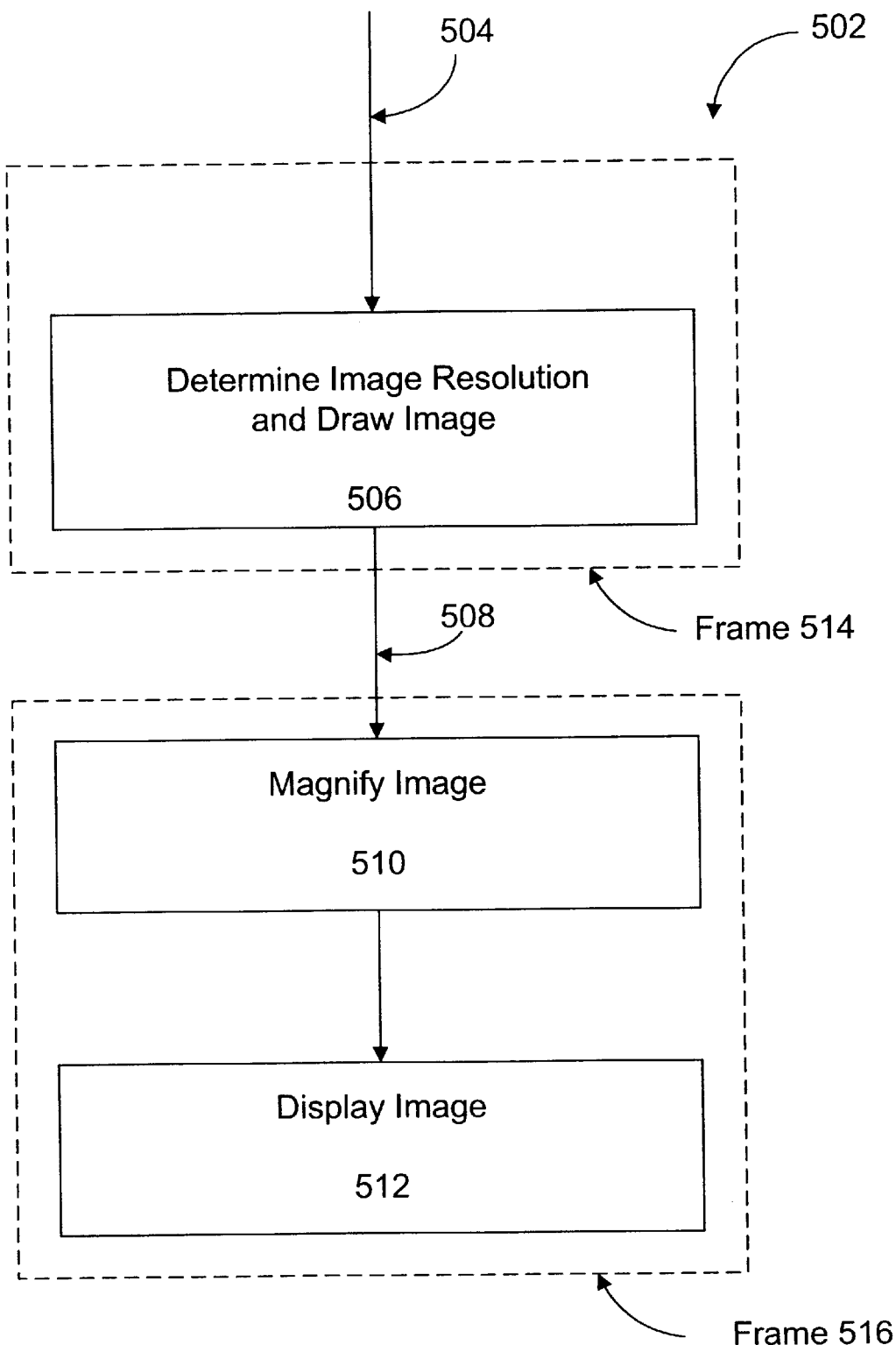
FIG. 5 is a flow chart illustrating the control flow for dynamic image resizing.

The overall control flow of dynamic image resizing is illustrated in FIG. 5. In FIG. 5, rasterization system 106 generates and renders (draws) one graphic image per frame, frame 514. The image is of variable complexity and is to be displayed with a target resolution during the subsequent frame, frame 516.

Referring again to FIG. 5, in step 506 during the rendering of frame 514, the rasterization system 106 first determines an image resolution to be used when rendering the current image to a frame buffer. The image resolution comprises the resolution coefficients used to render the current image. The image resolution may or may not be the target resolution. After determining the image resolution, the rasterization system 106 renders the current image to a frame buffer according to the image resolution. Thus, step 506 may reduce an image by a percentage. Step 506 is described in further detail below.

Step 506 completes, within the time period of one frame, such as frame 514, the rendering of an image into a frame buffer which is accessible by display system 110. After step 506, display system 110 in step 510 reads the rendered image from the frame buffer and outputs the rendered image to output device 112 at the target resolution.

Display system 110 magnifies the image by the percentage that the image was reduced when the image was rendered in step 506. The magnification ensures that the image is displayed at the target resolution required by the display device. It is an important feature that the image position is constant during magnification. A constant image position ensures a users's illusion of no change in the image content.

In step 512, the image is displayed to a user at output device 112. Display system 110 and output device 112 complete steps 510 and 512 within the time period of one frame, frame 516.

Figure 6:
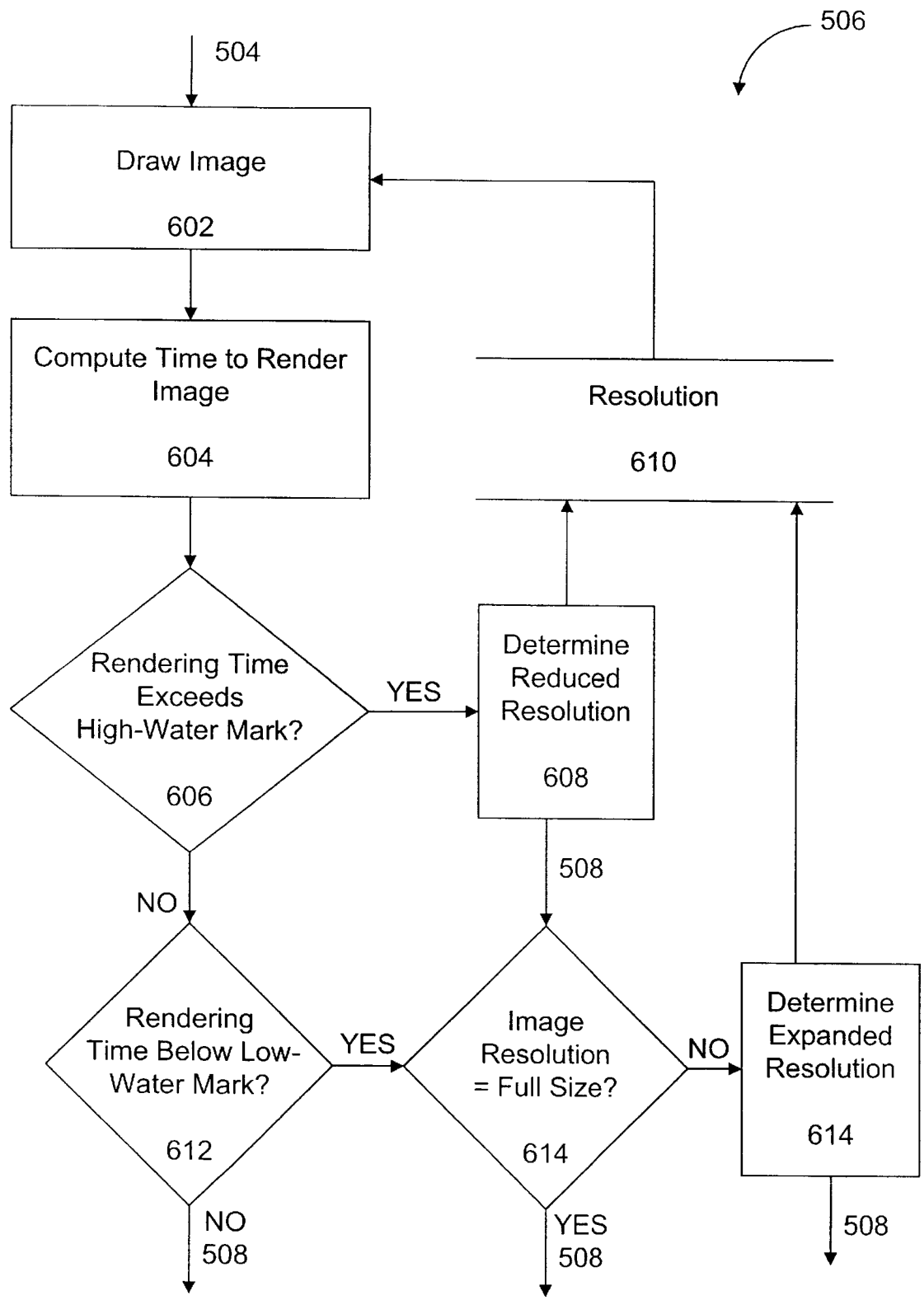
FIG. 6 is a flow chart illustrating how the image resolution is determined and the image is drawn according to a step found in FIG. 5.

FIG. 6 describes the details of rasterization system 106 in step 506 of FIG. 5. The process of step 506, determining an image resolution and rendering the current image at that resolution to a frame buffer, is completed within the time period of one frame, frame 514.

There are multiple methods available for determining an image resolution of a current image. For example, rasterization system 106 can perform an analysis of image complexity based on the content of the current image to be rendered, or can perform an analysis on multiple previous images, thereby identifying a trend in image complexity.

The chosen embodiment of the present invention, however, determines an image resolution based solely on the performance of the previous frame. That is, the time it took to render the previous frame's image is the basis for the image resolution of the current image. It is to be understood that this retroactive analysis is one example and is not intended to limit the present invention.

Referring again to FIG. 6, in step 602, rasterization system 106 renders the current image to a frame buffer. The image is rendered to an image resolution 610. After the current image is rendered, rasterization system 106 proceeds to step 604.

In step 604, rasterization system 106 computes the rendering time. The rendering time is the time it took to render the current image from the rasterization system 106 to the frame buffer.

Continuing to step 606, rasterization system 106 compares the rendering time of the current image to a high-water mark. The high-water mark represents a rendering time at which an image resolution would start to be reduced, thereby ensuring that the image can be rendered within one frame time period. The rendering time increases or decreases in proportion to the complexity of the current image. If the rendering time increases to the point of exceeding a high-water mark, rasterization system 106 proceeds to step 608.

In step 608, rasterization system 106 determines a new reduced image resolution 610. The image resolution 610 is then used during the rendering of the next frame's image (the image of frame 516) in step 602. Rasterization system 106 exits step 608, thereby exiting step 506, and waits for the start of the next frame, frame 516.

Referring again to step 606, if the rendering time does not exceed the frame time, then rasterization system 106 continues to step 612. In step 612, rasterization system 106 compares the rendering time of the current image to a low-water mark. The low-water mark represents a rendering time at which a reduced image resolution would start to be increased. If the rendering time for the current image is less than the low-water mark, rasterization system 106 proceeds to step 614.

In step 614, rasterization system 106 checks if the image resolution equals the target resolution (i.e., a full size). If so, then the image cannot be expanded because the image is already rendered to the target resolution. Rasterization system 106 exits step 614, thereby exiting step 506, and waits for the start of the next frame, frame 516.

Referring again to step 614, if the image resolution does not equal the target resolution, rasterization system 106 proceeds to step 616. Step 616 indicates that the image was rendered at a reduced image resolution or that the image is of a low complexity, such that there is spare time during the frame. This spare time can be used to render the next image at a higher resolution. In step 616, rasterization system 106 derives an expanded image resolution and stores it as the new image resolution 610. After this, rasterization system 106 exits step 616, thereby exiting step 506, and waits for the start of a new frame, frame 516.

Referring again to step 612, if the rendering time is not below a low-water mark, then the image resolution is appropriate for the complexity of the current image. Rasterization system 106 exits step 612, thereby exiting step 506, and waits for the start of the next frame, frame 516.

During continuous operation, a first frame, (e.g., frame 1) the image resolution 610 used to render a first image (e.g., image 1), equals the target resolution. In the next frame, such as frame 2, the rendering time of image 1 forms the basis of the image resolution used to render a second image, such as image 2, to the frame buffer. Likewise, in a frame 3, the rendering time of image 2 is the basis of the image resolution used to render image 3 to the frame buffer. This process is repeated for every frame.

Figure 7:
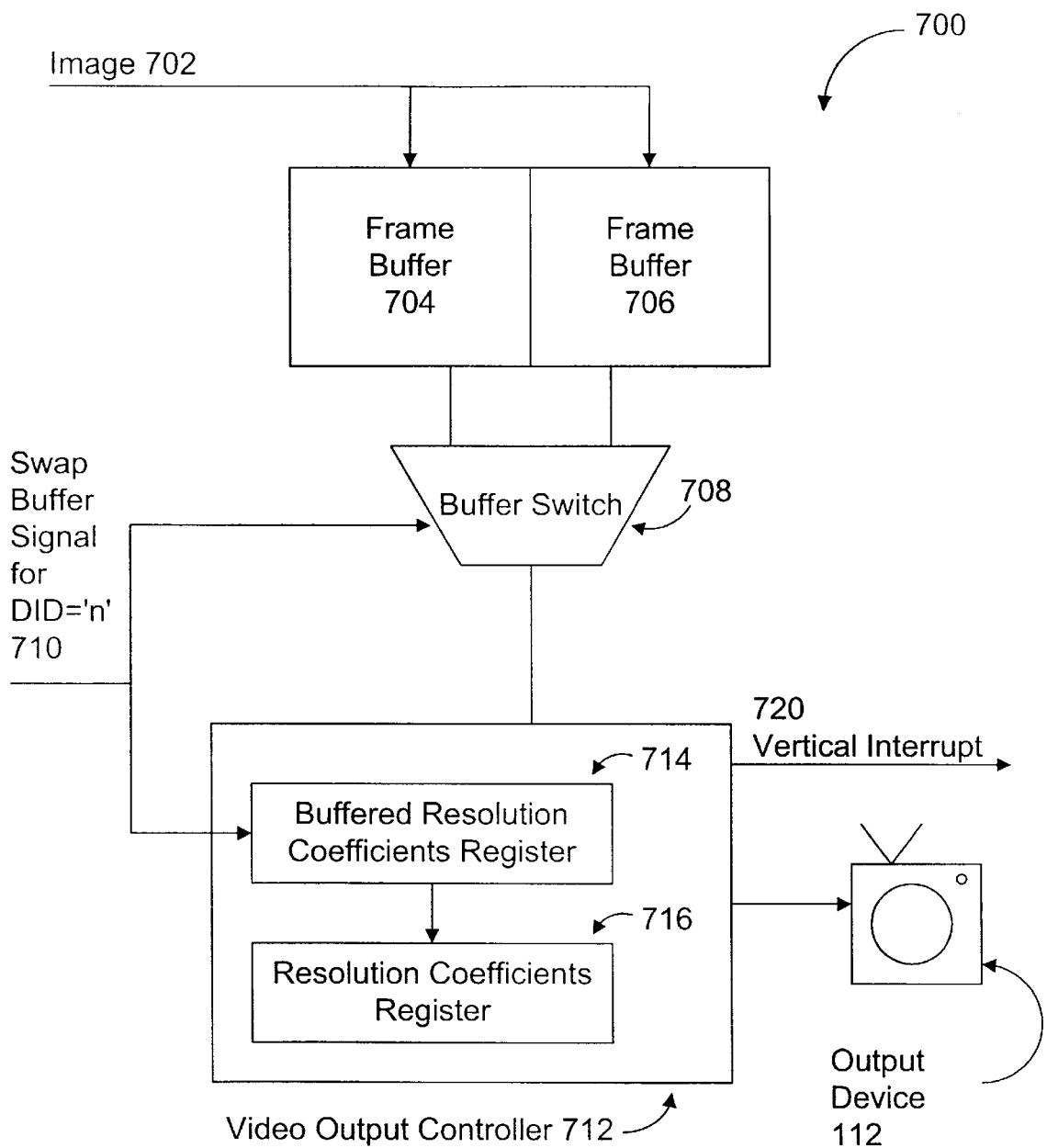
FIG. 7 illustrates the synchronization between a rasterization system, which renders an image into a frame buffer, and a display system, which outputs an image to a display device.

FIG. 7 is a block diagram showing the synchronization required for the present invention of dynamic image resizing. More specifically, FIG. 7 illustrates the synchronization between rasterization system 106 of step 506, which renders an image into a frame buffer during frame 514, and display system 110 of step 510, which outputs an image to a display device during frame 516.

Double-buffering is used. There are two frame buffers, frame buffer 704 and frame buffer 706. In operation, rasterization system 106 renders an image into one frame buffer, such as frame buffer 704, while video output controller (VOC) 712 reads a previously rendered image from the second frame buffer, frame buffer 706, and outputs that image to output device 112. In a preferred embodiment, the VOC 712 is a portion of the display system 112, although those skilled in the art will recognize its functionality can be provided in another internal or external system.

Double buffering ensures that a user is never viewing an image as it is being rendered. For example, while rasterization system 106 renders an image into frame buffer 704 during frame 514, VOC 712 reads the image rendered during the frame preceding frame 114 (from frame buffer 706) and outputs it to output device 112. The two frame buffers 704 and 706 are swapped frame-by-frame. Thus, continuing with the previous example, in the next frame (frame 516) rasterization system 106 renders an image to frame buffer 706, and VOC 712 reads the rendered image in frame buffer 704 and outputs it to the output device 112.

A pointer is used to implement the double-buffering, which in this case is buffer switch 708. Buffer switch 708 indicates which frame buffer, either frame buffer 704 or frame buffer 706, to render to, and which frame buffer to read from. When rasterization system 106 has completed rendering an image to one side of the frame buffer, the buffer switch 708 may be changed such that VOC 712 now reads the side containing the newly rendered image, and rasterization system 106 renders to the frame buffer which VOC 712 has just finished displaying.

Buffer switch 708, however, must not be changed prematurely. That is, although rasterization system 106 may finish rendering an image to a frame buffer at any time during a frame, the buffer switch 708 is not changed at that point. Changing the buffer switch 708 in the middle of a frame may result in VOC 712 switching frame buffers in the middle of reading a rendered image and outputting it to the output device 112. Therefore, updating of buffer switch 708 occurs only during vertical blanking by the VOC 712 on output device 112. Vertical blanking is when the VOC 712 resets its current location on the output device 112 from the bottom right corner (the position after completing the output of an image) to the top left corner (the position for beginning the output of an image); in other words, vertical blanking occurs after the electron beam has performed a full sweep of the pixels.

It is also possible to drive multiple display devices, each displaying a different graphic image. For example, output device 112 may be one of a plurality of display devices. Each channel or display device can be independently resized such that each uses a different magnification ratio and swap rates. Each display device channel is assigned a unique display identification, (DID) which is used to dynamically resize that channel independently of the other channels. That is, when the frame buffers of a specific channel (such as the channel with DID='n' corresponding to output device 112) are to be swapped, the buffer switch 708 receives the corresponding swap buffer signal for DID='n' 710 and swaps the frame buffers associated with that DID. A more detailed description of the DID implementation is provided below.

When outputting an image from frame buffer 704 or frame buffer 706, to an output device 112, VOC 712 magnifies the image to the target resolution. Magnification is required if rasterization system 106 reduced the image resolution in step 506 due to the image complexity. Therefore, a mechanism exists for synchronizing rasterization system 106 and VOC 712 and for communicating an image's resolution to the VOC 712, thereby ensuring that the correct magnification occurs prior to display. Though this synchronization can be performed in any manner that would be logical to one having skill in the art, one particular method is disclosed below.

The following description of synchronization is in terms of a single channel corresponding to output device 112 with channel DID='n.'. First, rasterization system 106 stores the image resolution of a rendered image in the buffered resolution coefficients register 714. This is accomplished in either step 608 or 616, depending on whether the image resolution is reduced or expanded respectively. This ensures that display system 110 has the correct coefficients to magnify each image for output to output device 112.

Second, a swap buffer signal for DID='n' 710 enters a buffer switch 708 and the VOC 712, indicating that frame buffer 704 and frame buffer 706 (and the associated resolution coefficients) are to be swapped.

Upon receiving the swap buffer signal for DID='n' 710, the buffer switch 708 swaps the frame buffers 704, 706. If rasterization system 106 was rendering an image into frame buffer 704 and VOC 712 was outputting an image from frame buffer 706 to output device 112, then after the swap buffer signal for DID='n' 710, rasterization system 106 renders to frame buffer 706 and VOC 712 outputs frame buffer 704. When the next swap buffer signal for DID='n' 710 is received, the buffer switch 708 swaps the frame buffers again.

Also upon receiving the swap buffer signal for DID='n' 710, VOC 712 moves the contents of the buffered resolution coefficients register 714 to the resolution coefficients register 716. Therefore, VOC 712 uses the resolution coefficients associated with the current image being output (to output device 112) and the correct level of magnification occurs. This process is dynamic and capable of independently changing image resolution on a frame-by-frame basis for each display device. This process further ensures that every graphic image, regardless of its complexity, is processed for each display device within the required time period of one frame.

Third, VOC 712 generates a vertical interrupt 720 at the start of vertical blanking on output device 112. VOC 712 sends the vertical interrupt 720 to rasterization system 106 and the appropriate display system 110 components to trigger the swap buffer signal for DID='n' 710. This synchronizes the rasterization system 106 and VOC 712 operations.

In one embodiment, the multi-channel feature is used by maintaining a table of DIDs, wherein each bit in the table maps to a unique DID, and thereby maps to a unique channel number or display device. Thus, when there is a change in the bit for a particular DID 'n' 710, a swap buffer signal for DID='n' 710 is sent to the buffer switch 708 and to the buffered resolution coefficients register 714 of the VOC 712 that corresponds to the assigned channel. The swap buffer signal for DID='n' 710 causes the buffer switch 708 to swap the corresponding frame buffer 704 and frame buffer 706 and causes the resolution coefficients to be loaded from the corresponding buffered resolution coefficients register 714 into the corresponding resolution coefficients register 716.

In one embodiment, the DID table of the multi-channel feature is implemented by using the X Window System, which is a standard protocol for the implementation of network-based UNIX Window Systems. The X Window System provides users and developers with the functionality for creating and managing a window environment in a network-based computer system; that is, an environment comprising multiple windows on multiple display devices. For more information on X Window Servers, see Israel and Fortune, *The X Window System Server,* X Version 11, Release 5, Digital Press 1992, which is incorporated herein by reference in its entirety. Description in these terms is provided for convenience only, and not to be considered limiting.

The X Window System Server, X-Server, can manage multi-head configurations including a single graphics display connected to multiple display devices. The X-Server assigns each window, called an X-window, on a display device a unique DID and implements a standard protocol of double-buffering each X-window's image. The X-Server independently swaps the double frame buffers of each X-window via a swap buffer bit associated with each DID. Thus, when the X-Server wants to swap the frame buffers of an X-window with DID='n,' the X-Server swaps the corresponding swap buffer bit resulting in that X-window's frame buffers to be swapped.

In one embodiment, the above-noted X-Server mechanism is used to implement the DID table of the multi-channel feature. A correspondence is made between each display device and a DID. Each display device's DID is an X-window DID, such that each display device, output device 112, comprises one X-window covering the entire display area. Therefore, each bit in the DID table is an X-Server swap buffer bit because each display device channel DID represents one X-window. The chosen embodiment uses the X-Server mechanism to swap each channel's frame buffers independently of the other channels, thereby allowing for independent dynamic resizing of graphic images across multiple channels.

V. Combining Multiple Video Streams

The above-noted method for generating output image 306 from base image 302 and overlay image 304 can be confining for the user. In some cases, the overlay image is stored in a reduced format by using indices in place of actual pixel values, in order to save space in the frame buffer. Here, in place of rendering actual pixels into the overlay image frame buffer, an n-bit color index is stored therein. In a preferred embodiment, this process occurs in rasterization system 106, although it can occur in another (internal or external) system.

The process of display processing was described with respect to FIG. 4. To recap, the processing is performed either on a binary basis or-using blending. Here, binary basis processing means that if the overlay image pixel is not opaque, then the base image pixel is displayed as an output pixel, whereas if the overlay image pixel is opaque, then the overlay image pixel is displayed as an output pixel. On the other hand, if blending is used, then a blending operation occurs between the base image pixel and the overlay image pixel to form the output image pixel. The process is performed by way of multiplexers that combine the base image and overlay image pixels into output image pixels. Any type of blending operation can be used.

Each color index, which is used in place of a pixel to save buffer space, is used by the display system 110 to locate the actual colors of the pixel. If color indices (versus actual pixels) are used by the overlay image frame buffers, then the pixels of the overlay image and the base image cannot be combined until after the indices have been transformed back to pixels in display system 110. Accordingly, one feature of the present invention is to delay the combining stage (using combining multiplexers) in display system 110 until the transformation of the indices back to pixels is complete. This processing need not take place in display system 110. For example, the processing can occur in rasterization system 106 or an external system, so long as it occurs after the transformation.

Another more important problem is that the system may have to treat the base image frame and the overlay image frame differently. Any processing that alters the form of one of the images makes it difficult to combine the two images. An excellent example is the above-noted use of dynamic image resizing to alter the base image.

Dynamic image resizing (described in section IV) is performed when it is desired to maintain a constant frame rate, despite differing complexities between frames. Unfortunately, dynamic image resizing of the base image has made the use of an overlay difficult, if not impossible, until the present invention. This is because multiplexing of base image pixels and overlay image pixels normally occurs after resizing of the base image pixels. After the base image is reduced (or expanded) by rasterization system 106, it may not be of a size that can be multiplexed with the overlay image, which has remained stagnant. This problem is corrected in the following process.

Figure 8:
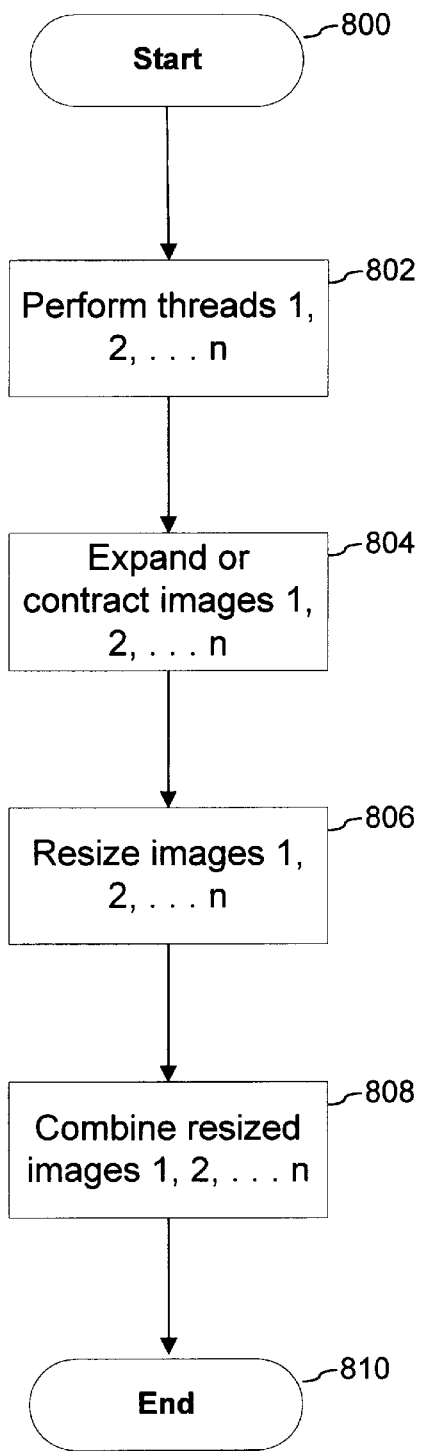
FIG. 8 illustrates a process for combining a plurality of video streams into a single output frame.

FIG. 8 illustrates a process for combining a plurality of video streams into a single output frame. Rather than treating the overlay image frame as a stagnant frame, the overlay image is treated the same as another base image. In fact, the present invention permits combining any two or more dynamically resized video streams, on a per-frame basis.

After start step 800, control passes to step 802 where processing for threads 1 . . . n occurs. Each thread is a separate portion of a complete rendering operation for an image. During this partial rendering operation, for each thread, (corresponding to a single image rendering operation) the process of creating vertices at the host, using the vertices to create primitives at the geometry system, and transmitting the created primitives to rasterization system 106 is accomplished. In addition, the images can come from different media, such as video, computer-generated imagery, or other sources.

In step 804, the first part of dynamic image resizing is performed for each thread. This part of dynamic image resizing can be performed as described in section IV. During the process, the rasterized fragments (triangles) are contracted or expanded in size before being transformed into pixels during rendering. For complex images, the fragments can be contracted, whereas for simple images, the fragments can be expanded. For example, fragment contraction is performed in order to reduce how much space the fragments occupy (and how long it takes to process them) in the frame buffer being rendered to. The processed two-dimensional fragments are then transformed into pixels for output to display system 110.

This step is preferably performed by rasterization system 106, because it constitutes part of the rendering operation. However, it may be performed by another system, such as display system 110, or by an external system.

In a preferred embodiment, each thread 1 . . . n is separately double-buffered, by swapping frames dedicated for the thread. Therefore, it is possible that the threads have different refresh rates for rendering of the pixels into the frame buffers. For example, an extremely complex computer-animated image may render at 4 frames per second, while a conventional video image may render at 60 frames per second.

This step need not be limited to the specific operation described in section IV. Those skilled in the art will recognize that the goal of the system is to change the sizes of the sequential images of each frame, regardless of image complexity, to maintain a constant or frame rate. So, for example, a predefined protocol may also be used for the images of one or more threads, while the method of section IV may be used for the images of one or more other threads.

In a preferred embodiment, swap synchronization is used between the rendered images of the different threads. This is an art-recognized procedure to maintain synchronization (in time) between the frames of image 1, image 2, . . . , image n.

In step 806, image 1, image 2, . . . image n, corresponding to thread 1, thread 2, . . . thread n, whether expanded or contracted, are resized to a target size. This part of dynamic image resizing can also be performed as described in section IV. In a preferred embodiment, the target size of each image is the same as that image's original size preceding step 804. This resizing can be implemented as described in section IV, or by other methods that will become apparent to those skilled in the art, upon understanding the present invention.

Either a "pull model" or a "push model" can be used to provide display processing. As noted, in the pull model, (which was described in section IV) after rasterization system 106 renders to a frame buffer, in the subsequent frame the pixels of the rendered image are "pulled" out for display processing by display system 110. On the other hand, in a push model, the pixels of the subsequent frame are "pushed" out by the rasterization system 106, for display processing by display system 110. As will be recognized by those skilled in the art, the dynamic image resizing functions can be combined in one or more systems of the graphics pipeline, or can instead be separated from these components into one or more independent entities.

In a preferred embodiment, resized image 1, resized image 2, . . . , resized image n, should be the same size, in terms of two-dimensional pixel size. This is accomplished in order that the pixels can be easily combined in the next step.

In step 808, the resized images from thread 1, thread 2, . . . thread n, namely resized image 1, resized image 2, . . . , resized image n, are combined using a multiplexer. In a preferred embodiment, this is accomplished according to the process of FIG. 4. The difference, however, is that here the multiplexing function is provided after resizing of the images has been completed. In a preferred embodiment, this function is performed by display system 110, though those skilled in the art will recognize the function can be provided by another system (such as rasterization system 106, or an external system).

The corresponding pixels in the resized images can be blended or combined in a binary manner. For one example, the user may select to blend the pixels of image 1 and image 2, and provide image 3 as an overlay. Here, the pixels of image 1 and image 2 would be blended to form combined image A, and then any opaque pixels of overlay image 3 (in corresponding pixel positions) would cover combined image A, to form combined image B. Use of art-recognized blending and overlaying techniques are limited only by the user's imagination.

This technique uses bandwidth already available to expand the image compositing function. The "wires" and other hardware to read overlay and base images out of the respective frame buffers is available before the present implementation. The reason is because there must be functionality in place to read both an overlay image pixel and a base image pixel for display output, if any combining of the two images is to occur. The present invention permits using the same bandwidth to perform dynamic resizing of the base image and the overlay image, or for that matter any two or more images.

The process ends in step 810. In the alternative, the above steps 800 through 808 can be repeated to generate new images, that will be combined with previously combined images.

VI. An Implementation of the Invention

Figure 9:
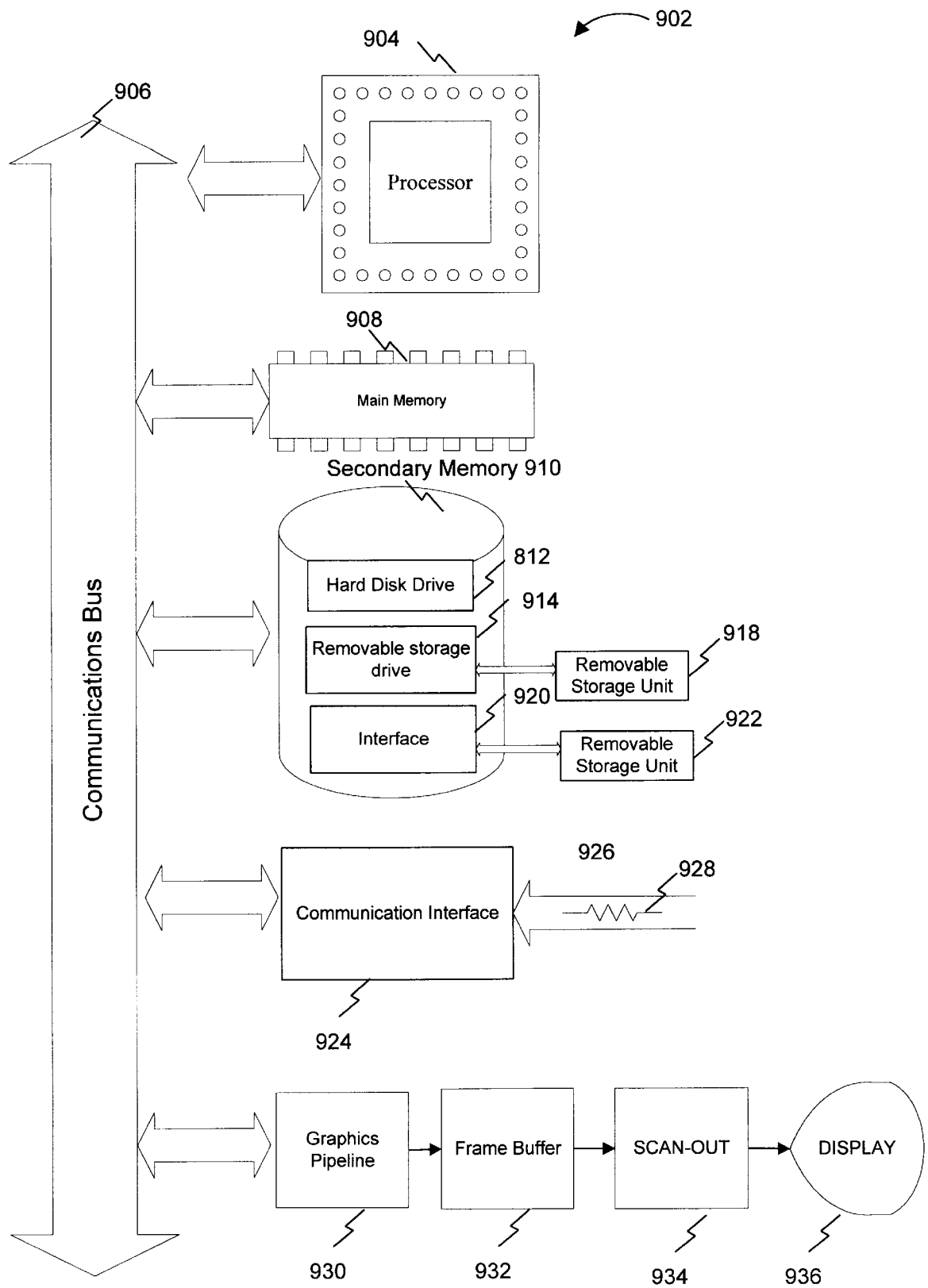
FIG. 9 illustrates a block diagram of a computer useful for implementing elements of the present invention.

As stated above, the invention may be implemented using hardware, software or a combination thereof and may be implemented in a computer system or other processing system. In fact, in one embodiment, the invention is directed toward a computer system capable of carrying out the functionality described herein. An example computer system 902 is shown in FIG. 9. The computer system 902 includes one or more processors, such as processor 904. The processor 904 is connected to a communication bus 906. Various software embodiments are described in terms of this example computer system. After reading this description, it will become apparent to a person skilled in the relevant art how to implement the invention using other computer systems and/or computer architectures.

Computer system 902 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 902. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 918 to computer system 902.

Computer system 902 can also include a communications interface 924. Communications interface 924 allows software and data to be transferred between computer system 902 and external devices. Examples of communications interface 924 can include a modem, a network interface (such as an Ethernet card), a communications port, a PCM-CIA slot and card, etc. Software and data transferred via communications interface 924 are in the form of signals which can be electronic, electromagnetic, optical or other signals capable of being received by communications interface 924. These signals 926 are provided to communications interface via a channel 928. This channel 928 carries signals 926 and can be implemented using wire or cable, fiber optics, a phone line, a cellular phone link, an RF link and other communications channels.

Computer system 902 can also includes a graphics pipeline 930, corresponding to the graphics pipeline shown in FIG. 1. The graphics pipeline comprises the hardware and software that take input commands and produce therefrom data in the format of pixels. The pixels are output to frame buffer environment 932, corresponding to frame buffer environment 108. Frame buffer environment 932 varies from a simple buffer capable of storing two-dimensional images, to a state-of-the-art device capable of displaying textured, three-dimensional, color images. Scan-out device 934 comprises rendering hardware that selectively reads the pixels from frame buffer environment 932 and transmits the pixels to display 936. Display 936, comprising for example a cathode ray tube (CRT), provides a physical display of the pixels. The scan-out device 934 and display 936 comport in function with the sophistication of the frame buffer environment 932.

In this document, the terms "computer program medium" and "computer usable medium" are used to generally refer to media such as removable storage device 918, a hard disk installed in hard disk drive 912, and signals 626. These computer program products are means for providing software to computer system 902.

Computer programs (also called computer control logic) are stored in main memory and/or secondary memory 910. Computer programs can also be received via communications interface 924. Such computer programs, when executed, enable the computer system 902 to perform the features of the present invention as discussed herein. In particular, the computer programs, when executed, enable the processor 904 to perform the features of the present invention. Accordingly, such computer programs represent controllers of the computer system 902.

In an embodiment where the invention is implement using software, the software may be stored in a computer program product and loaded into computer system 902 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VII. Conclusion

While the invention has been particularly shown and described with reference to preferred embodiments thereof, it will be understood by those skilled in the relevant art that various changes in form and details may be made therein without departing from the spirit and scope of the invention.

What is claimed is:

1. A method for determining a resolution and rendering an image, comprising the steps of:

(a) rendering a current image frame into a frame buffer at an image frame resolution;

(b) computing a rendering time determined by how long it takes to render a previous image frame into said frame buffer;

(c) comparing said rendering time to a high-water mark, wherein said high-water mark represents a second rendering time at which an image frame resolution would start to be reduced, and
reducing said resolution for a next image frame, if said rendering time exceeds said high-water mark; and (d) comparing said rendering time to a low-water mark, wherein said low-water mark represents a third rendering time at which an image frame resolution would start to be increased, and
expanding said resolution for a next image frame, if said rendering time is below said low-water mark and said image frame resolution does not equal a target resolution.

2. A method according to claim 1, further comprising the steps of:

(e) double buffering said current image frame,
wherein a first frame buffer receives said current image frame rendered by step (a), and a second frame buffer stores a previously-rendered image frame rendered by step (a);

(f) double buffering said image frame resolution,
   wherein a buffered resolution coefficients register stores said image frame resolution, and
   wherein a resolution coefficients register stores an image frame resolution for said previously-rendered image frame; and
(g) synchronizing said double buffering of said current image frame with said double buffering of said image frame resolution,
   wherein said first frame buffer and said second frame buffer are swapped concurrently with a transfer of the content of said buffered resolution coefficients register to said resolution coefficients register.

3. A method for combining image frames 1 through n, wherein n is an integer greater than or equal to two, comprising the steps of:
(a) performing a partial rendering of image frames 1 through n;
(b) dynamically sizing image frames 1 through n by calculating one or more image frame resolutions, and dynamically resizing the resulting frames to generate resized image frames 1 through n, wherein said dynamic sizing and resizing for image frames 1 through n comprises the steps of
   (1) rendering the current image frame into a frame buffer at an image frame resolution,
   (2) computing a rendering time based on how long it takes to render a previous image frame into said frame buffer,
   (3) comparing said rendering time to a high-water mark, wherein said high-water mark represents a second rendering time at which said image frame resolution would start to be reduced, and reducing said resolution for a next image frame if said rendering time exceeds said high-water mark, and
   (4) comparing said rendering time to a low-water mark, wherein said low-water mark represents a third rendering time at which said image resolution would start to be increased, and expanding said resolution for a next image frame, if said rendering time is below said low-water mark and said image frame resolution does not equal a target resolution, and
(c) combining said resized image frames 1 through n to form a combined image frame for display.

4. A method according to claim 3, further comprising:
(d) repeating steps (a) through (c) if one or more new image frames (n+1) through m are desired to be combined with said combined image frame, wherein m is an integer greater than or equal to three.

5. A method according to claim 3, wherein step (a) comprises the steps of:
   generating one or more vertices describing shapes of desired graphical objects;
   performing geometry calculations on said vertices to generate one or more primitives; and
   transmitting said primitives to a system for performing rasterization thereon.

6. A method according to claim 3, wherein step (b) comprises one of the steps of:
   generating and contracting fragments for each of image frames 1 through n wherein the complexity of the image is greater than a threshold level; and
   generating and expanding fragments for each of image frames 1 through n wherein the complexity of the image is less than a threshold level.

7. A method according to claim 6, wherein step (b) further comprises:
   transforming each of said set of fragments 1 through n into corresponding pixels.

8. A method according to claim 3, wherein step (b) further comprises:
   (5) double buffering said current image frame,
      wherein a first frame buffer receives said current image frame rendered by step (1), and a second frame buffer stores a previously-rendered image frame rendered by step (1);
   (6) double buffering said image frame resolution,
      wherein a buffered resolution coefficients register stores said image frame resolution, and
      wherein a resolution coefficients register stores an image frame resolution for said previously-rendered image frame; and
   (7) synchronizing said double buffering of said current image frame with said double buffering of said image frame resolution,
      wherein said first frame buffer and said second frame buffer are swapped concurrently with a transfer of the content of said buffered resolution coefficients register to said resolution coefficients register.

9. A method according to claim 3, further comprising one of the steps of:
   using a push model,
      wherein a rasterization system renders said image frames 1 through n to a plurality of frame buffers and pushes said image frames 1 through n to a display system for display; and
   using a pull model,
      wherein a rasterization system renders said image frames 1 through n to a plurality of frame buffers, and a display system extracts said image frames 1 through n for display.

10. A method according to claim 3, wherein step (c) comprises one of the steps of:
   (1) using a binary display method, wherein as between a first image frame of image frames 1 through n and a second image frame of image frames 1 through n:
      a pixel of said first image frame is displayed in lieu of a corresponding pixel of said second image frame if said first image frame pixel is opaque, and
      said corresponding pixel of said second image frame is displayed if said first image frame pixel is non-opaque; and
   (2) using a blending display method, wherein pixels of a first image frame of image frames 1 through n and corresponding pixels of a second image frame of image frames 1 through n are blended together.

11. A system for combining image frames 1 through n, wherein n is an integer greater than or equal to two, comprising:
   means for performing a partial rendering of image frames 1 through n;
   means for dynamically sizing image frames 1 through n by calculating one or more image frame resolutions, and dynamically resizing the resulting frames to generate resized image frames 1 through n, wherein said dynamic sizing and resizing means comprises
      means for rendering the current image frame into a frame buffer at an image frame resolution,
      means for computing a rendering time based on how long it takes to render a previous image frame into said frame buffer, means for comparing said rendering time to a high-water mark, wherein said high-water mark represents a second rendering time at which said image frame resolution would start to be reduced, and wherein said means for comparing said rendering time to a high-water mark reduces said resolution for a next image frame, if said rendering time exceeds said high-water mark, and means for comparing said rendering time to a low-water mark, wherein said low-water mark represents a third rendering time at which said image resolution would start to be increased, and wherein said means for comparing said rendering time to a low-water mark expands said resolution for a next image frame, if said rendering time is below said low-water mark and said image frame resolution does not equal a target resolution; and means for combining said resized image frames 1 through n to form a combined image frame, and displaying said combined image frame.

12. A system according to claim 11, wherein said performing means comprises:

means for generating one or more vertices describing shapes of desired graphical objects;

means for performing geometry calculations on said vertices to generate one or more primitives; and means for transmitting said primitives to a system for performing rasterization thereon.

13. A system according to claim 12, wherein said dynamic sizing and dynamic resizing means comprises:

means for generating and contracting fragments for each of image frames 1 through n wherein the complexity of the image is greater than a threshold level; and means for generating and expanding fragments for each of image frames 1 through n wherein the complexity of the image is less than a threshold level.

14. A system according to claim 13, wherein said dynamic sizing and dynamic resizing means comprises:

means for transforming each of said set of fragments 1 through n into corresponding pixels.

15. A system according to claim 11, wherein said sizing and resizing means further comprises:

means for double buffering said current image frame, wherein a first frame buffer receives said current image frame, and a second frame buffer stores a previously-rendered image frame;

means for double buffering said image frame resolution, wherein a buffered resolution coefficients register stores said image frame resolution, and wherein a resolution coefficients register stores an image frame resolution for said previously-rendered image frame; and means for synchronizing said current image frame double buffering means and said image frame resolution double buffering means, wherein said first frame buffer and said second frame buffer are swapped concurrently with a transfer of the content of said buffered resolution coefficients register to said resolution coefficients register.

16. A system according to claim 11, further comprising one of:

push model means, comprising:
a rasterization system for rendering said image frames 1 through n to a plurality of frame buffers and for pushing said image frames 1 through n to a display system for display; and pull model means, comprising:
a rasterization system for rendering said image frames 1 through n to a plurality of frame buffers, and
a display system for extracting said image frames 1 through n for display.

17. A system according to claim 11, wherein said means for combining comprises:

(i) binary display means,
wherein as between a first image frame of image frames 1 through n and a second image frame of image frames 1 through n,
said binary display means displays a pixel of said first image frame in lieu of a corresponding pixel of said second image frame if said first image frame pixel is opaque, and
said binary display means displays said corresponding pixel of said second image frame if said first image frame pixel is non-opaque; and (ii) blending display means,
wherein said blending display means blends pixels of a first image frame of image frames 1 through n and corresponding pixels of a second image frame of image frames 1 through n together to form said combined image frame.

* * * * *